United States Patent [19]

Nadel

[11] 4,065,539
[45] Dec. 27, 1977

[54] METHOD OF MOLDING PLASTIC CONTAINERS

[76] Inventor: Murray Nadel, 433 Beechmont Drive, New Rochelle, N.Y. 10804

[21] Appl. No.: 654,658

[22] Filed: Feb. 2, 1976

Related U.S. Application Data

[63] Continuation-in-part of Ser. No. 518,955, Oct. 29, 1974, abandoned.

[51] Int. Cl.$^2$ .............................................. B29D 3/00
[52] U.S. Cl. .................................. 264/251; 264/254; 264/273; 264/275
[58] Field of Search ............... 264/250, 251, 254, 273, 264/275, 242

[56] References Cited

U.S. PATENT DOCUMENTS

| | | | |
|---|---|---|---|
| 1,755,292 | 4/1930 | Gagnon | 264/274 |
| 3,214,504 | 10/1965 | Gemberling | 264/242 |
| 3,263,008 | 7/1966 | Bender | 264/90 |

Primary Examiner—Robert F. White
Assistant Examiner—James R. Hall
Attorney, Agent, or Firm—H. Gibner Lehmann; K. Gibner Lehmann

[57] ABSTRACT

A method of molding plastic containers of the type having enclosure portions which are adapted to be hingedly connected to one another. One embodiment of the invention involves a method for making a mirror-containing, cosmetic compact, comprising the steps of placing a mirror component face down on a mirror support of one of two cavity-defining molding dies, holding the mirror component against the mirror support, bringing both dies together, and injection molten plastic into the die cavities to cause it to back up and also surround the peripheral edge portions of the mirror so as to form one half of the compact. The method further includes, either at a later time or else simultaneously, the additional step of placing a hinge part in a recess of one of the mold cavities adjacent the mirror, and causing molten plastic to flow around a portion of the hinge part whereby the latter will be held captive in the plastic in predetermined relation to the mirror and the molded compact half. The molding dies are then separated and the molded compact half containing the hinge and mirror removed and transferred to a second set of dies, where molding of the cooperable casing half is effected around another portion of the hinge. Another embodiment of the invention more generally embraces the molding of a plastic container having an enclosure portion and a hinge carried by the enclosure portion, wherein the improvement comprises the step of molding the plastic of the enclosure portion around a part of the hinge to rigidly secure the latter to the enclosure portion in embedded relation.

6 Claims, 12 Drawing Figures

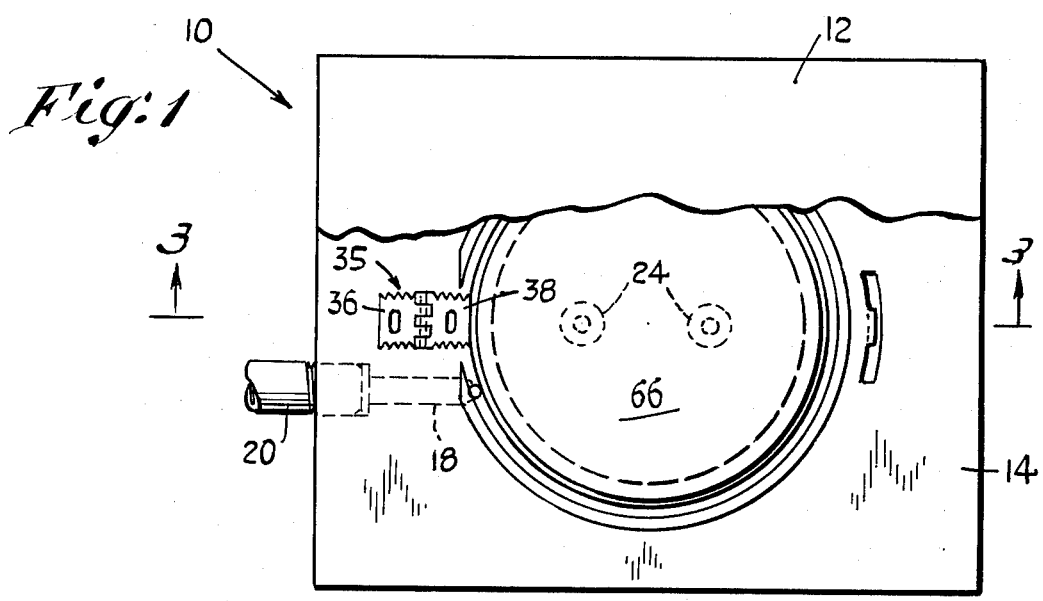
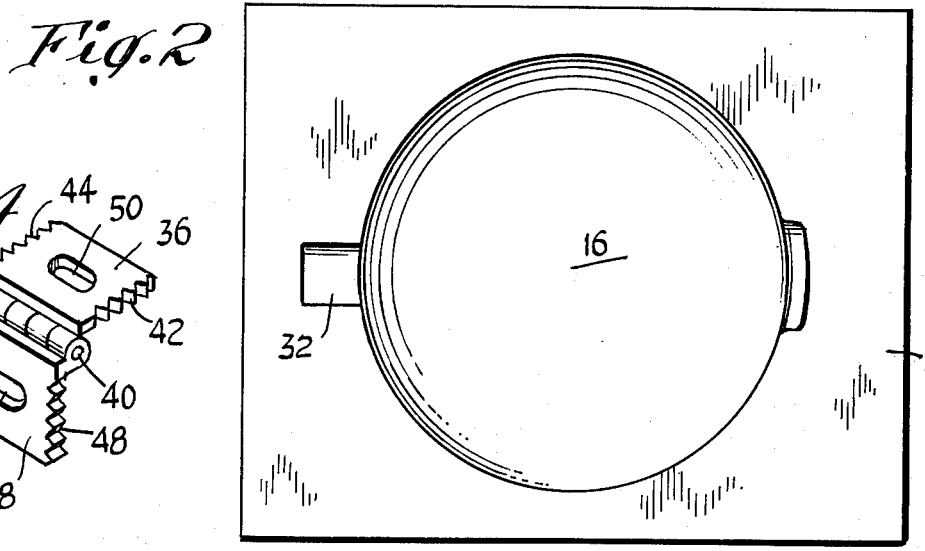
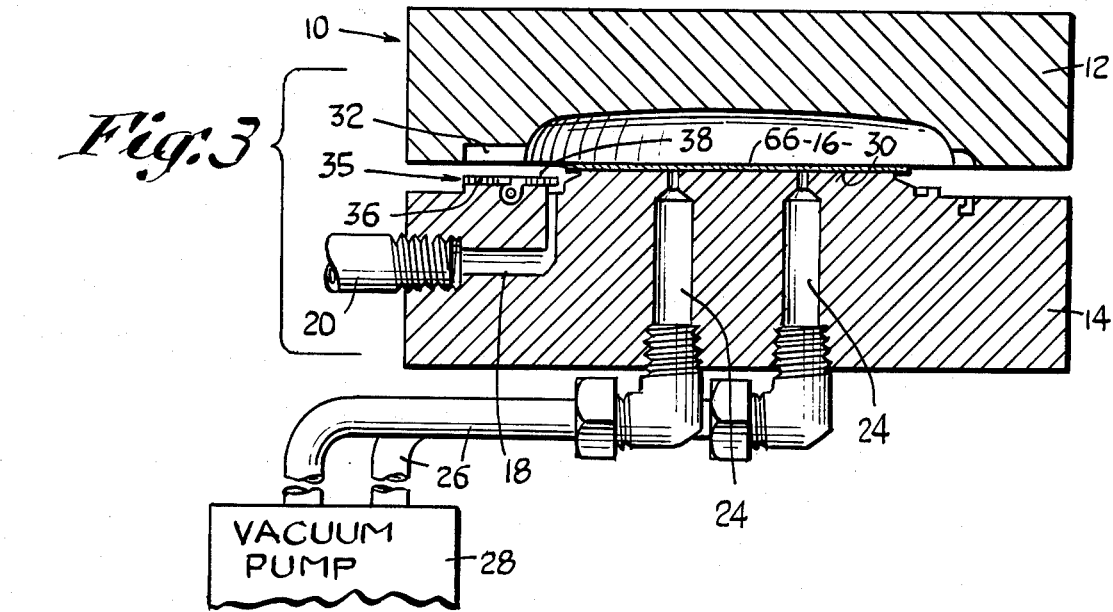

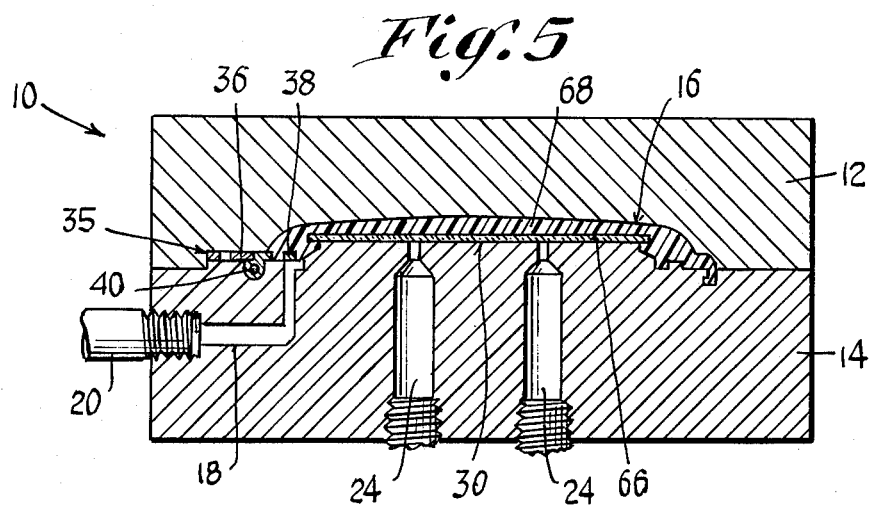
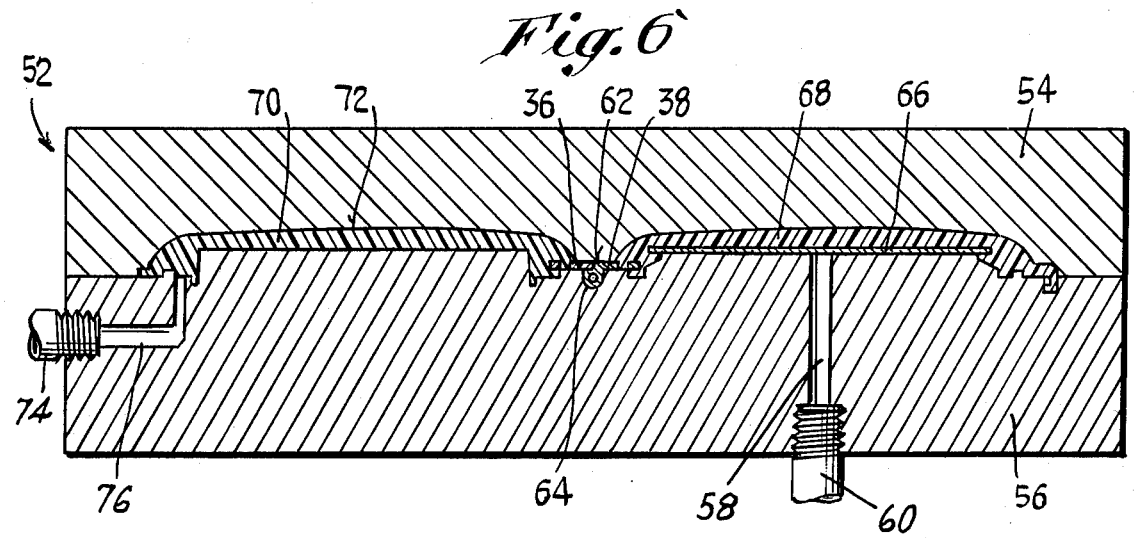
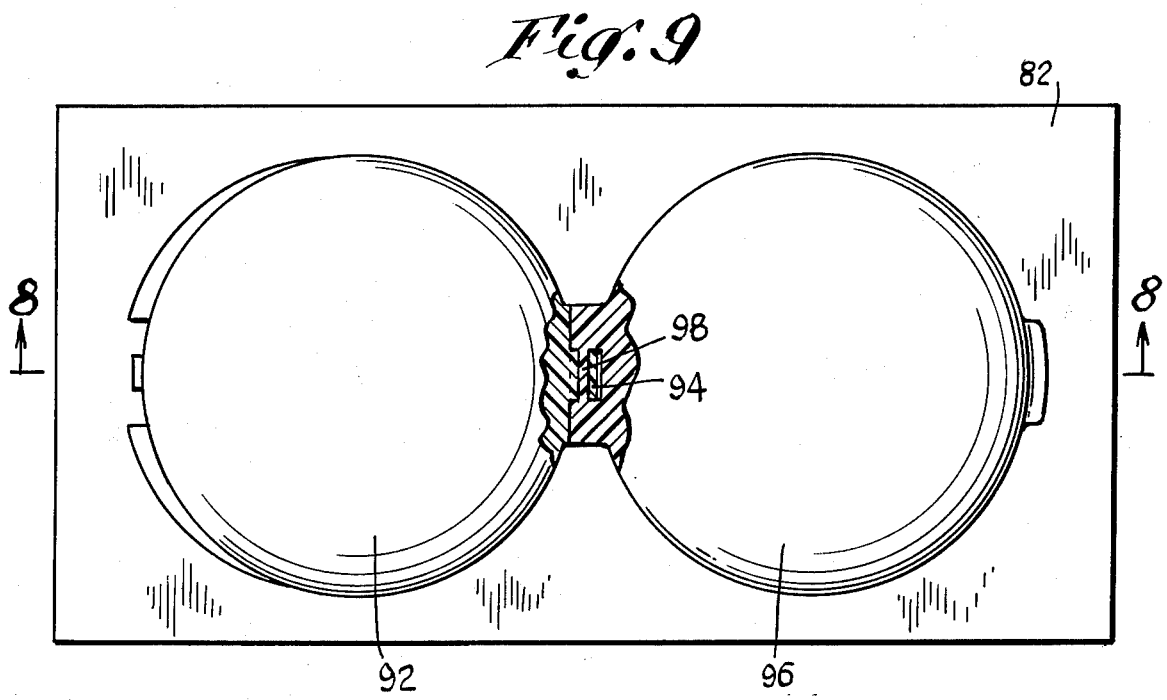

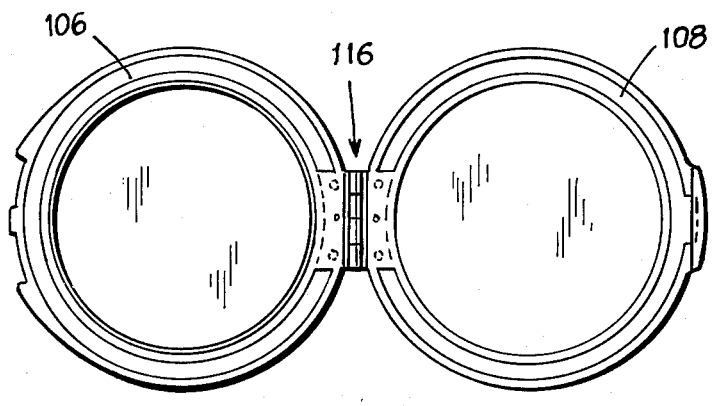
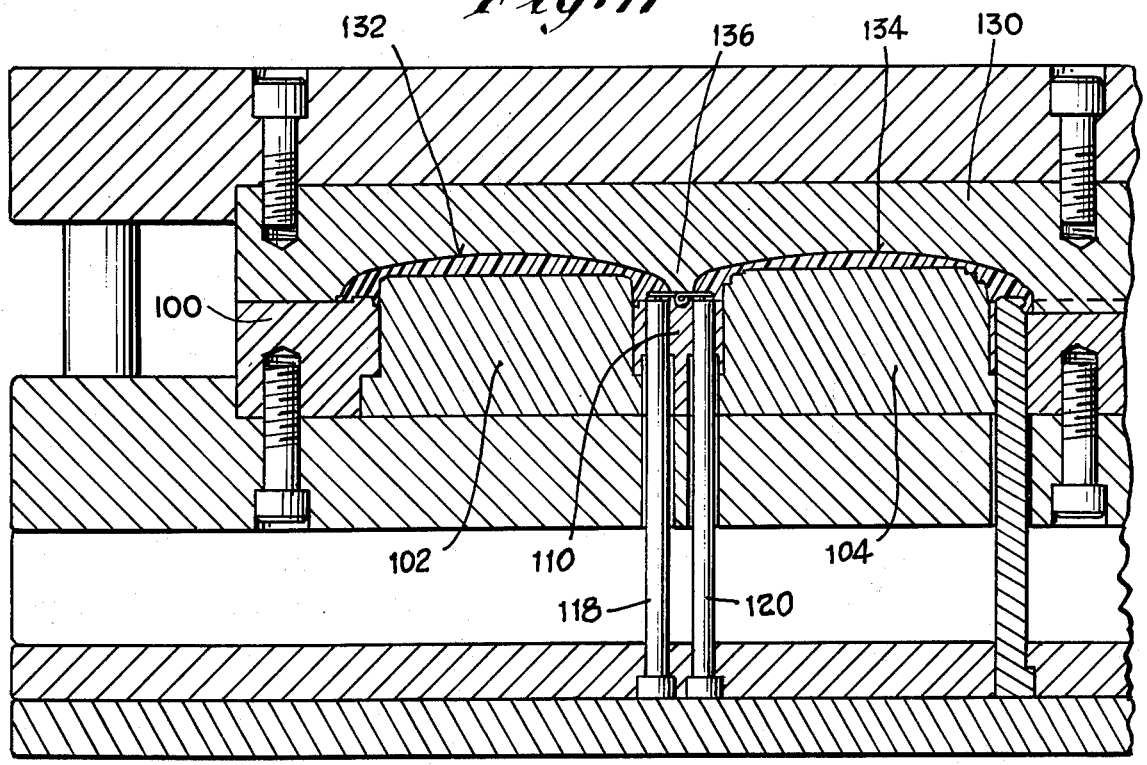
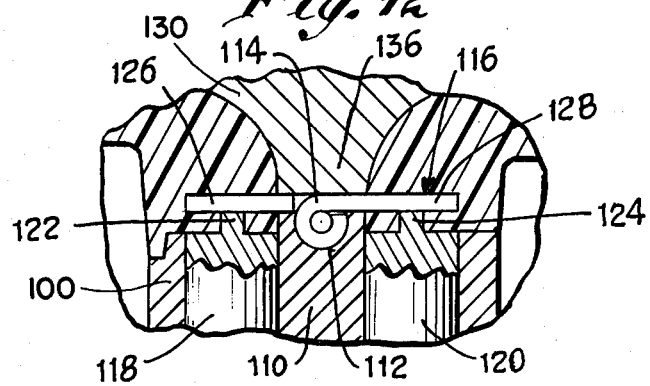

METHOD OF MOLDING PLASTIC CONTAINERS

CROSS REFERENCES TO RELATED APPLICATIONS

This application is a continuation-in-part of my co-pending application Ser. No. 518,955 filed Oct. 29, 1974 and entitled "METHOD OF MOLDING PLASTIC CONTAINERS", which is now abandoned.

BACKGROUND

This invention relates generally to methods for making plastic containers, cosmetic compacts and the like, and more particularly to methods of providing a hinge construction between two mating casing enclosures or halves, and methods of securing insert members such as mirrors in such casing halves.

In the past, there have been proposed a number of schemes for molding plastic containers or casings of the kind employed in cosmetic compacts. Generally, the casings heretofore produced consisted of two mating casing parts or halves, each of which was molded separately. The molds incorporated recessed portions that formed halves of a hinge, each hinge half being adapted to mate with the corresponding second hinge half.

Several drawbacks became apparent with this construction. In most circumstances, the hinges required separate and distinct hinge pins to effect assembly of the casing halves. Such pins were usually constituted of metal and necessitated an additional step during the assembly of the finished case. In addition, problems with misalignment could occur, and there sometimes developed a tendency for the pin to fall out. Breakage of the plastic hinge halves sometimes occurred as the hinge pins were being press-fitted therein. At best, these prior constructions were costly and actually represented a compromise in that additional assembly time was always involved.

As a further example, in cosmetic compacts, mirror members were disposed in one of the casing halves and were usually retained in place either by a press fit, or by ultrasonic welding, glue, or cement; alternately, a separate retainer ring or bezel was employed, which latter was received in an undercut surface of an annular portion or recess of the compact.

There were several disadvantages to the above arrangements. Press-fitting was not satisfactory, since it imposed stringent requirements in the form of tolerances of the mirror and of the recess in which the mirror was to be received. Glues and cements on the other hand were messy and time-consuming to use. Also, care had to be taken not to let the solvent of the glue contact the silvered surface of the mirror. Retainer rings or bezels represented workable solutions to the problem of securing a mirror in place, but such rings resulted in additional expense, inasmuch as they constituted separate parts that had to be molded to fairly close tolerances, and since they required additional assembly time.

SUMMARY

The above drawbacks and disadvantages of prior methods for constructing plastic containers such as compacts and the like are obviated by the present invention, which has for an object the provision of an improved method of molding plastic casings, the method being both simple and economical, and greatly minimizing the number of steps required in assembly. A related object is the provision of a method which is both low in cost and less time consuming than other methods previously known. A still further object is the provision of an improved method which relies only minimally on tolerances of the various molded parts. As a result, manufacture and assembly are greatly simplified.

The above objects are accomplished by the unique method of molding plastic containers of the type having enclosure portions which are adapted to be hingedly connected to one another. The method involves molding of the plastic of the enclosure portion around one part of a hinge so as to rigidly secure the latter to the enclosure portion in embedded relation. The method further embraces the molding of a plastic casing, such as a mirror-containing cosmetic compact, in an apparatus which employs the mirror as an insert and which employs the hinge as an insert. In carrying out this further method, one of two cavity-defining dies has a mirror support with vacuum ports. The method comprises placing a mirror face down on this support while the dies are separated, holding the mirror in place on the support, then bringing the dies together with major portions of the cavity disposed at the back of the mirror, and thereafter injecting molten plastic substance through a suitable port in one of the dies so as to fill the cavity and surround peripheral edge portions of the mirror as well as to back up the mirror. After the plastic has been cooled and solidified, the dies are separated and the molded piece with its captive mirror removed. The method of the invention also involves the step of causing molten plastic to flow around a portion of a hinge which has been placed in a recess in one of the dies. This latter step is preferably accomplished at the same time that the molten plastic is caused to flow in back of and around the mirror. The molded casing half with its mirror and hinge is then placed in a second set of dies which are adapted to mold a cooperable casing half around the other (free) portion of the hinge in an analogous manner to the molding of the first casing half around the first portion of the hinge. By this method, both the mirror and one portion of the hinge are incorporated first into one casing half during the molding thereof, and then another portion of the hinge is incorporated into the second casing half during the molding of the latter.

In another embodiment of the invention a hinge part is placed on a land surface of a lower die between portions adapted for molding a compact base and a compact cover and held elevated by small nibs. The upper die half having complementary cavities is then brought in place over the lower half, and molten plastic introduced into the die whereby the cover and base of the compact are simultaneously molded around the hinge part, in a single molding cycle. As a result, both the cost of the compact and the assembly time are greatly minimized.

Other features and advantages will hereinafter appear.

In the drawings, illustrating the methods of the invention:

FIG. 1 is a top plan view of a pair of superposed dies for molding a first casing half, the upper die being partially broken away.

FIG. 2 is a bottom plan view of the upper die of FIG. 1.

FIG. 3 is a section taken on line 3—3 of FIG. 1, wherein the dies are separated and wherein a mirror is shown as placed face down on a mirror support of the lower die.

FIG. 4 is a perspective view of a hinge which is adapted to be incorporated in the casing halves during the molding thereof.

FIG. 5 is a section like that of FIG. 3, illustrating the dies assembled to one another, with molten plastic being introduced into the cavity formed therebetween.

FIG. 6 is a vertical section of a second set of dies, for holding the first casing half and hinge in position with the latter serving as an insert, while the second casing half is molded around the hinge.

FIG. 9 is a top plan view of the bottom die member of FIG. 8, having the molded compact still in place.

FIG. 10 is a plan view of a molded plastic compact, in open condition,, made by a one-step molding operation in accordance with the invention.

FIG. 11 is a vertical section through the mold parts, showing the molding of the compact of FIG. 10, and FIG. 12 is an enlarged section of a fragmentary portion of FIG. 11, illustrating the support means for the hinge part of the compact.

Figure 8:
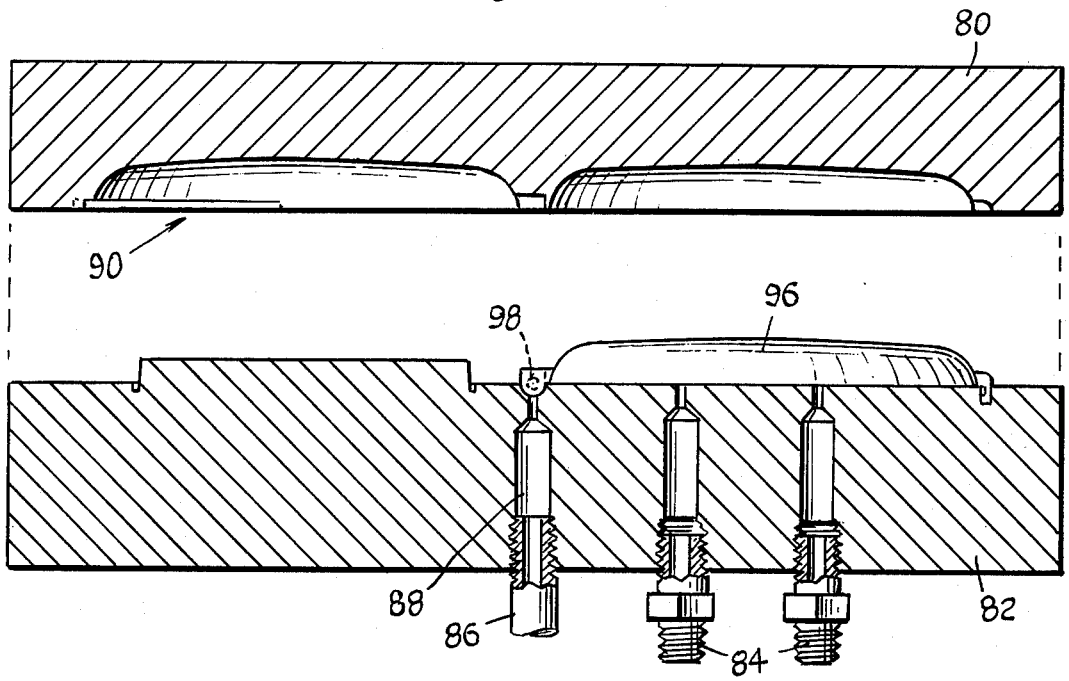
FIG. 8 is a section taken through another set of die halves, illustrating the second step of the molding operation of this embodiment.

Referring first to FIGS. 1–3 and 5, there is illustrated a pair of dies generally designated by the numeral 10, comprising an upper die 12 and a lower die 14, the two defining a hollow cavity 16. As shown, the lower die 14 has an inlet port 18 with a threaded wall, adapted to receive tubing 20 which extends to a source of molten plastic (not shown). In addition, the lower die 14 is also provided with a pair of suction lines 24 which are connected by means of tubing 26 to a vacuum pump 28. The lower die 14 comprises a substantially flat mirror support 30 which is adapted to position a mirror member, as will be explained below, and a supporting surface including a semi-cylindrical recess for receiving the pintle or bearing portion of a hinge 35 also to be described below. In addition, an additional small recess 32 at one end of the cavity 16 provides a relief or clearance area for the hinge 35.

As particularly illustrated in FIG. 4, the hinge or hinge part 35 comprises portions or halves 36 and 38 which are pivotally movable with respect to one another about a pin 40. Each of the portions 36, 38 preferably has serrated edges 42, 44 and 46, 48, respectively, and in addition, one or both hinge portions may be provided with central apertures 50. In the appended claims, either one of the halves 36 or 38 is referred to as an anchorage portion, with the parts of the hinge immediately surrounding the pin 40 being referred to as a pintle portion.

Referring now to FIG. 6, there is illustrated an additional set of dies, generally designated by the numeral 52, comprising an upper die 54 and a lower die 56. The latter has a suction line 58 adapted to be connected to a vacuum pump by means of tubing 60. The upper die 54 preferably has a recess 62 for receiving and supporting, as an insert, a portion of a hinge prior to the actual molding process described below; in a similar manner the lower die 56 is provided with a recess 64 to provide clearance for the hinge insert.

In accordance with the present invention there is provided a novel method for molding plastic containers such as cosmetic compacts having cooperable enclosure portions or casing halves adapted to be hingedly secured to one another, comprising the steps of placing a mirror member 66 face down (or silvered surface up) on the mirror support 30 of the lower die 14, as shown in FIG. 3, activating the vacuum pump in order to introduce a vacuum at the suction lines 24, thereby to securely hold the mirror 66 against the support, bringing the upper die 12 into its operative position, as illustrated in FIG. 5, such that major portions of the cavity 16 are disposed at the back of the mirror, and injecting molten thermoplastic under pressure through the port 18 as supplied from the reservoir and through the supply tubing 20, such that the cavity 16 is completely filled with the molten plastic which also flows around the peripheral portions of the mirror 66. Thereafter, the plastic substance is allowed to cool and solidify in the well-known manner.

During this molding cycle, the plastic will also flow around the anchorage portion 38 of the hinge 35, along the serrated edges 46, 48 thereof and also through the aperture 50, such that after the plastic solidifies, a rigid connection between the casing half and the hinge portion 38 will be realized.

Following a sufficient, normal cooling of the casing half just described, the upper die 12 is removed from the lower die 14, the vacuum in lines 24 relieved, and the assemblage consisting of the casing half 68, mirror 66 and hinge 35 removed from the lower die.

Referring now to FIG. 6 and in accordance with the present invention, there is further provided a novel method for molding a second casing half, generally designated by the numeral 70, around the hinge portion 36, said method comprising the steps of placing the previously molded assemblage in a position such that the hinge partially occupies the recess 64 of the lower die 56, assembling the upper die 54 to the lower die 56 and thereafter introducing molten plastic through the tubing 74 and port 76 to the cavity 72 defined between the two die halves. As the molten material is introduced into the cavity, it will flow around the hinge portion 36, thus filling the grooves in the serrated edges 42, 44 and flowing through the aperture 50. After the cavity 72 is completely filled, the molten plastic is allowed to have the normal cooling time, following which the upper die half 54 can be removed and the molded assemblage consisting of the casing half 68, mirror 66, hinge 35 and lower casing half 70 removed from the lower die 56.

It is to be noted that by the above arrangement only two separate molding steps or cycles are required, the first involving the mirror 66 and hinge portion 38, and the second involving the casing half 70 and a hinge portion 36. As can now be understood, when the casing half 70 is removed, the main production of the compact is complete, requiring no further manufacturing steps other than possibly some minor finishing of the casing halves at the location of the ports 18 and 76, or decorative embellishment.

Figure 7:
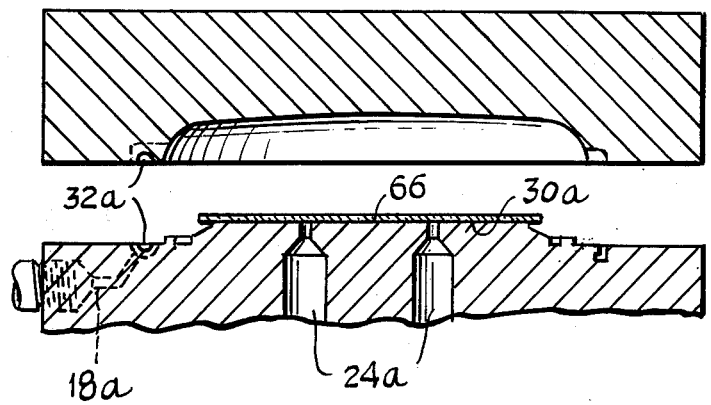
FIG. 7 is a fragmentary sectional view of two die halves shown separated, with a mirror member positioned on the mirror support of one die half. This figure illustrates the first step in the method of FIGS. 7–9, constituting another embodiment of the invention.

Another method is shown in FIGS. 7–9. Upper and lower dies 80, 82 are provided, the latter having suction lines 84 extending to a vacuum pump (not shown) and a supply line 86 extending to a source of molten plastic (not shown). The supply line 86 communicates through the port 88 with the cavity 90 formed by the dies 80, 82.

There is provided a method for molding a container, particularly a second casing half thereof which is generally designated by the numeral 92, together with an integral hinge part 94, these being joined to an existing casing half 96 which has been molded with integral hinge pin or pintel 98. The step of molding the first casing half and integral hinge pin is illustrated in FIG. 7. A mirror member 66 is placed face down on the mirror support 30a of the lower die, and a vacuum introduced at the suction lines 24a thereof. The dies are then assembled, and molten plastic introduced through the port 18a so as to surround and back up peripheral edge portions of the mirror member 66. In addition, plastic flows into a pintle-forming recess 32a, half of which is disposed in the upper die and the other half of which is disposed in the lower die. When the plastic has cooled and solidified, the dies are disassembled, and a first casing half 96 having an integral hinge pin or pintle 98 removed therefrom.

The remaining steps are illustrated in FIGS. 8 and 9. The first casing half 96 with the integral hinge pin, is placed on the lower die 82. Lines 84 are connected to the vacuum pump to hold the casing half 96 in place. The upper die 80 is then assembled to the lower die, and molten plastic, now of a different composition, introduced into the cavity 90 so as to flow around the pin 98 and form a hinge part or sleeve integral with the casing half being molded. After the cavity has been filled, the plastic is allowed to cool and solidify and the assemblage consisting of the two casing valves and integral hinge removed from the dies. Freedom from sticking between the two hinge parts can be obtained by either of two methods. If the melting point of the substance employed to fabricate the second casing half is substantially lower than that of the substance employed in the first casing half, any deleterious softening of the hinge part or pin 98 will not occur, and there will remain a discrete interface between the two substances. The fit will in all likelihood be quite snug, which has been found to be a desirable feature. Alternately, following molding of the first half, it can be sprayed or coated with a suitable release agent before being introduced into the dies 80, 82 to prevent any permanent bonding of the hinge part 94 to the pin 98. Such a release agent could be sprayed or brushed over the pin 98 immediately prior to the molding step shown in FIG. 8.

The use of two distinct heat-distortion materials having different softening or melting points for forming the hinge parts, has been found to provide a satisfactory solution to the problem of molding the second hinge part or sleeve around the existing pin or pintle. Alternately, materials having different viscosities (flows) could readily be employed to achieve equivalent results.

Still another embodiment of the invention, which refines the improved method further by eliminating a molding step, is illustrated in FIGS. 10–12. According to this embodiment, the base and cover parts of the compact are simultaneously molded about the hinge part whereby the co-operative components are all related and joined in a single molding cycle.

As shown, there is a lower mold half 100 provided with cavity-forming portions 102, 104 which are adapted to form the hollow or cavity areas respectively of the compact base 106 and cover 108. Between the portions 102, 104 there is a land or support 110 provided with a recess 112, both adapted to receive and support on them the pintle portions 114 of the hinge part 116. The lower mold half 100 also has knock-out pins 118, 120 whose upper portions or ends are provided with upstanding nibs 122, 124. It will be seen from FIG. 12 that the anchorage portions 126, 128 of the hinge part 116 can rest on and be supported by the nibs 122, 124.

The molding apparatus includes an upper mold half 130 having cavities 132, 134 respectively for forming the compact base 106 and cover 108. Between the cavities 132, 134 there is a backing portion 136 on the upper mold half 130, adapted to engage the upper surface of the hinge part 116 and securely anchor the latter in position between the mold halves when these are assembled in preparation for molding. The nibs 122, 124 in such circumstance securely support and space the hinge anchorage portions 126, 128 above the lower mold half 100, as seen in FIGS. 11 and 12.

With the mold halves assembled as in FIG. 11 and holding captive the hinge part 116, molten plastic is injected into the cavities 132, 134. Such plastic flows around the anchorage portions of the hinge part 116 as indicated in FIG. 12 whereby said part except for the pintle portions 114 is securely embedded in the plastic that forms the compact base 106 and cover 108.

Advancing the knock-out pins 118, 120 upward will eject the molded plastic from the lower mold half 100 after the upper half 130 has been removed.

Thus, in a single molding cycle a complete compact comprising base and cover parts and hinge part is fabricated, appearing as illustrated in FIG. 10.

From the above it can be seen that I have provided a novel method for molding plastic containers which is both simple and economical. Typically, only one molding step or cycle is required, and additional assembly and fabrication time is virtually eliminated. The method is thus seen to represent a distinct advance and improvement in the technology of plastic molding.

Variations and modifications are possible without departing from the spirit of the invention.

I claim:

1. The method of making a hinged, molded plastic compact in equipment employing cooperable, cavity-defining dies wherein one die has an inlet port for introducing molten plastic into the cavity and wherein another die has a supporting surface and a recess adjacent the same, comprising the steps of:
   a. disposing a hinge part having two anchorage portions and a connecting pintle portion so that all said portions rest on said supporting surface while the dies are separated, with the pintle portion disposed in and engaged with the walls of said die recess,
   b. bringing the dies together to locate portions of the die cavities adjacent one of said hinge anchorage portions, and to cause other portions of the dies to engage and closely confine the other of said anchorage portions and also said pintle portion so as to prevent the same from being surrounded and engaged by the molten plastic,
   c. injecting molten plastic through the port and into the die cavities, and also into engagement with and around said one hinge part anchorage portion to embed the same and hold the hinge part captive.
   d. cooling the plastic to solidify it,
   e. separating the dies from one another,
   f. removing the solidified molded plastic and captive hinge part as a unitary assemblage from one of the die halves,
   g. placing the assemblage comprising the solidified plastic and hinge part in another set of dies defining a cavity such that the other of the anchorage portions of the hinge part extends into a part of the defined cavity, h. injecting molten plastic into the defined cavity whereby it flows around and embeds said other anchorage portion of the hinge part, i. cooling the plastic to solidify it, and j. removing the solidified plastic and said assemblage from said other dies.

2. The method of claim 1, wherein:

a. step (g) entails disposing the hinge part at an edge of the said defined cavity of the dies.

3. The method of claim 1, wherein said hinge anchorage portions have through apertures and wherein:

a. step (c) entails injecting the molten plastic into one of said through apertures of a hinge part anchorage portion.

4. The method of making, in a single molding cycle, a molded plastic compact constituted of a plastic base part, a plastic cover part, and a hinge part having a pintle and connecting said parts for relative swiveling movement, comprising:

a. placing the hinge part over a pair of spaced-apart nibs carried by a lower mold half and on a land of the lower mold half at a location between cavity forming portions for the base and cover parts, b. lowering an upper mold half having cooperable base and cover cavities onto the lower mold half to cause a backing surface of the upper mold half to engage portions of said hinge part adjacent its pintle when the hinge part is supported by the said nibs and land in spaced relation to the remainder of the lower mold part, and c. injecting molten plastic into the mold cavities to form the compact base and cover and to flow under and over said hinge part except at the engaged portions thereof so that the hinge part is embedded in the molded plastic except for said portions, d. cooling the plastic to solidify it, and e. removing the compact after the plastic has solidified.

5. The method of claim 4, wherein step (e) entails:

a. removing the upper mold half from the lower mold half, and b. moving the said nibs upward after the upper mold half has been removed from the lower mold half, thereby to eject the hinge and adjoining portions of the compact base and cover from the lower mold half.

6. The method of claim 4, wherein said hinge part has said through apertures at locations removed from the engaged portions thereof, and wherein:

a. step (c) entails injecting the molten plastic into said apertures of the hinge part.

* * * * *